May 19, 1959 G. B. GREENE 2,887,674

PULSE WIDTH MEMORY UNITS

Filed May 14, 1953

INVENTOR
George B. Greene.
BY
Howard M. Dustin 2,887,674

PULSE WIDTH MEMORY UNITS

George B. Greene, Berkeley, Calif., assignor to Marchant Research, Inc., a corporation of California Application May 14, 1953, Serial No. 355,115

22 Claims. (Cl. 340—174)

Figure 1:
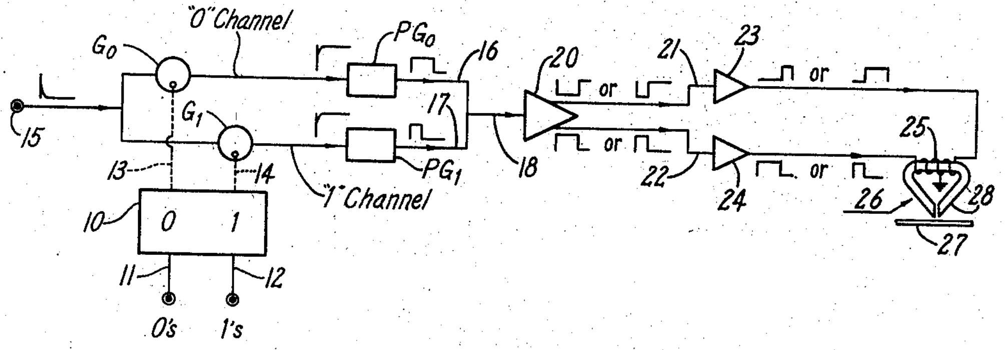

The present invention concerns digital computers, and more particularly relates to a variable pulse width memory system for such computers.

By virtue of the inherent on or off, 0 or 1, characteristics of present-day computing equipment, most digital computers operate either in the binary system or in some modification thereof. These computers often employ a memory unit for storing large quantities of digital information, one type of memory unit comprising a magnetic medium, such as a magnetizable tape. The medium may be moved relative to a "writing" transducer which magnetizes successive areas, or "cells" of the medium in either of two modes for representing the respective binary values 0 and 1. A medium which has been magnetized may be moved relative to a "reading" transducer which responds to the recorded information by producing a signal that is the first derivative of the signal employed for writing.

In the prior art, there are two principal systems of magnetizing a medium to represent binary information. The first such system is known as the "restore-to-zero" system, in which the binary value 1 may be represented by a positive pulse (magnetizing the medium to a first, or positive saturated state), and the binary value 0 is represented by a negative pulse (magnetizing the medium to a second, or negative saturated state). The area on the surface of the medium between digits is unsaturated and therefore requires that the medium be returned to a non-saturated condition between each two successive digits. Therefore, when information is to be read from a medium magnetized on the restore-to-zero basis, the magnetic history of the areas of the medium between digits has a decided influence on the strength of the signal derived from a magnetized cell, so that it is necessary to provide erasing equipment to insure non-saturation of these intermediate areas.

The restore-to-zero system has two advantageous characteristics, however, as follows: (1) the pulses employed for writing are all of substantially the same width, so that the amplifying circuits employed in conjunction with the memory unit need not have broad band characteristics and may, therefore, be of comparatively simple design; and (2) there is no necessity to provide an auxiliary clock pluse system for synchronizing the computer, since the leading or trailing edge of the magnetized area in each cell may be employed for this purpose.

The second principal system employed for magnetically recording digital information is known as the "non-restore" system in which, again, a positive state of saturation of an area on the medium represents a 1, and a negative state of saturation represents a 0, but in which there are no areas of nonsaturation. Contiguous cells which represent the same value 0 or 1 have no boundary between them, i.e., they constitute a region of saturation which is continuous until the recorded value changes from 0 to 1 or vice versa. In the non-restore system, the readout signal, being the first derivative of the writing signal, comprises a positive pulse when the recorded value changes from 0 to 1, and a negative pulse when the recorded value changes from 1 to 0. Since an indefinite number of 0's or 1's may be stored in a continuous series, there is no regularity in the time spacing of the readout signals. Therefore this system has no self-clocking property, and auxiliary means must be provided for synchronizing the recorded information with other units of the computer. Furthermore, since the width of the recording pulses depends entirely upon the number of consecutive 1's or 0's that are to be recorded, the amplifying circuits employed in conjunction with the memory unit must be capable of handling pulses which vary in width from a single cell to a large number of cells. In the non-restore system, however, since there are no regions of nonsaturation of the medium, there is no need for erasing equipment.

The present invention employs a recording system which combines the advantages of the restore-to-zero and the non-restore systems and eliminates the undesirable features of both. Each digit is represented by an individual magnetized area of the medium, thereby providing a self-clocking property, but there are no areas of the medium which are unsaturated, so that no erasing equipment is necessary. In the present system the medium is normally saturated in a first state, for example, negative. In each cell, a digit 0 or 1 is stored by saturating the medium in a second state, for example, positive, the distinction between a 0 and a 1 being the time of dwell in the second state of saturation. Before the end of any cell, whether it contains a 0 or a 1, the medium is returned to its first state of saturation. Therefore, a separate pulse is employed for writing each digit, and the widths of the two kinds of writing pulses do not differ greatly, so that broad band amplification is not required.

Although numerous other arrangements will be obvious to those skilled in the art, the present invention will be described in relation to a medium wherein all of the cells are of the same size, and wherein there is no space between consecutive cells. Either a 0 or 1 is written by reversing the state of magnetization of the medium at the leading edge of the corresponding cell. To complete the writing of a 0 in a cell, the state of magnetization is again reversed after approximately two thirds of the cell has passed the writing head, while to complete the writing of a 1, the state of the cell is reversed after approximately one-third of the cell has passed the writing head. A stored 0 and a stored 1 may be illustrated by the respective wave forms shown in Fig. 1 to the right of units $PG_0$ and $PG_1$, to be described hereinafter. Each full wave form thus represents a complete cell, and the high levels represent the respective dwells of reversed magnetization for a 0 and a 1.

It is therefore a principal object of the present invention to magnetically record a plurality of different items of information by magnetizing a respective area of unique size, on a magnetizable medium, to correspond to each item.

It is a more particular object of the invention to magnetically record binary information on a magnetic medium by magnetizing an area of a first size on the medium to represent a 0 and an area of a second size to represent a 1.

Further objects of the invention are:

To drive a magnetic recording head with pulses of two widths to represent the respective binary values 0 to 1.

To read out from a magnetic medium information recorded as magnetized areas of a plurality of sizes to represent a corresponding plurality of items of information.

To read out from a magnetic medium information recorded as magnetized areas of two sizes to represent the binary values 0 and 1.

To provide a self-clocking magnetic recording system wherein a medium is magnetized in either of two saturated states with no unsaturated dwells.

To represent binary information in successive cells of a magnetizied medium wherein there are no unsaturated dwells.

The underlying principles of the present invention are therefore the magnetization and detection of a magnetic medium in areas of a plurality of sizes to represent a corresponding plurality of items of information.

Figure 2:
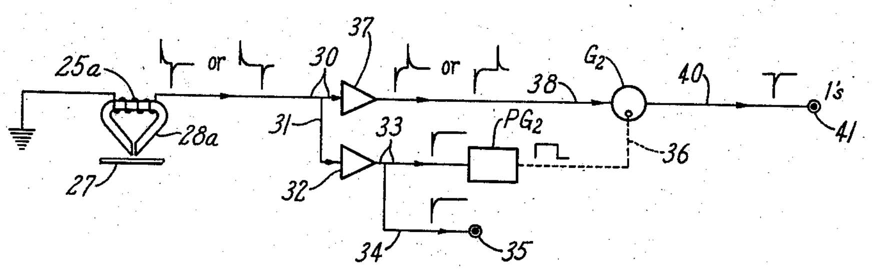

Other objects and principles of the present invention will appear from following description, reference being made to the drawing in which:

Fig. 1 is a block diagram of a writing circuit embodying the present invention, and Fig. 2 is a block diagram of a reading circuit embodying the present invention.

*Writing circuit*

The writing circuit of the present invention comprises a timing pulse input and a value selector which gates the timing pulses into a 0 channel or a 1 channel, according to the value of the digit to be written. In either channel, each timing pulse triggers a pulse generator which produces a square writing pulse of a predetermined width, the writing pulses generated in the 0 channel being, for example, twice the width of the writing pulses generated in the 1 channel. The writing pulses from both channels are amplified and fed to a magnetic transducer or "writing head," in such manner that the head is always energized in one or the other of two opposite directions. A medium moving adjacent the head is saturated by the head in a first direction for the duration of each 0 or 1 writing pulse, and is saturated in the opposite direction at all other times.

Referring to Fig. 1, a trigger circuit 10 is employed to control the gating of timing pulses from an input terminal 15 to either a 0 channel or a 1 channel, according to the value of a digit which is to be recorded.

The trigger circuit 10 has two stable states of operation, designated the 0 state and the 1 state, and is set for each digit to the appropriate one of its two states by a pulse on either a 0's bus 11 or a 1's bus 12. A gate $G_0$, which is connected to the trigger circuit 10 by a control lead 13, is armed when the trigger circuit is in its 0 state. Similarly, a gate $G_1$ is armed through a control lead 14 when the trigger circuit is in its 1 state. The trigger circuit 10, and each gate $G_0$ and $G_1$, may be of the types shown in Figs. 1 and 3, respectively, of the copending application Serial No. 344,025, filed March 23, 1953, by G. B. Greene.

A positive timing pulse is received at input terminal 15 following the selection of each digit on trigger circuit 10. Each timing pulse interrogates both gates $G_0$ and $G_1$ and is passed through one or the other of these gates, according to the digit selection, to produce a negative pulse in the related 0 channel or 1 channel.

A negative pulse in the 0 channel triggers a pulse generator $PG_0$ which produces a relatively wide square positive pulse on a lead 16, while a pulse in the 1 channel triggers a pulse generator $PG_1$ which produces a relatively narrow square positive pulse on a lead 17. For purposes of illustration, it will be assumed that the interval between timing pulses at terminal 15 is 12 microseconds and that the width of the square pulses generated by $PG_0$ and $PG_1$ are 8 microseconds and 4 microseconds, respectively. The units $PG_0$ and $PG_1$ may be any of the several well-known types of square pulse generators such, for example, as shown in Figs. 5–12 on p. 170 of "Waveforms," vol. 19, M.I.T. Radiation Laboratory Series, McGraw-Hill, New York, 1949.

The output leads 16 and 17 from $PG_0$ and $PG_1$ are joined to form a single input lead 18 to a phase inverter 20. The phase inverter may, for example, comprise a triode amplifier with anode and cathode resistors, and having a grid input from lead 18, an anode output to a lead 21, and a cathode output to a lead 22, or it may comprise simply a pulse transformer wherein leads 21 and 22 constitute output leads from opposite sides of the secondary winding.

Each positive pulse input to the phase inverter 20, from either $PG_0$ or $PG_1$, is amplified to produce on the output lead 21 a negative pulse of the same width as the input pulse, and on the output lead 22 a positive pulse of the same width as the input pulse. The positive pulse output on lead 22 may be related to an appropriate reference potential and treated as a negative pulse of a width which is the complement of the width of the negative pulse on lead 21. For example, when the phase inverter 20 receives a 0 pulse (8 microseconds wide) for $PG_0$, its output on lead 21 is an 8 microsecond negative pulse at the beginning of the 12 microsecond digit interval. The 8 microsecond positive pulse on lead 22 may be treated as the reference potential and the remaining 4 microseconds in the digit interval may be treated as a 4 microsecond negative pulse. Therefore, during each digit interval, there is an output from the phase inverter 20 comprising either an 8 microsecond or a 4 microsecond negative pulse on lead 21, followed by a corresponding 4 microsecond or 8 microsecond negative pulse on lead 22. The shapes of the above-described complementary pulse pairs are shown in Fig. 1 adjacent leads 21 and 22.

The pulses on leads 21 and 22 are amplified and inverted by a pair of amplifiers 23 and 24, and then feed to opposite sides of an energizing coil 25 of a writing head 26. A magnetic medium 27 is moved adjacent a gap 28 on the writing head and is magnetized to saturation in one or the other of two opposite directions, according to the direction of current through the coil 25. It will be seen that the medium is saturated in a first direction for either 8 or 4 microseconds at the beginning of each digit interval by a pulse from amplifier 23 representing either a 0 or a 1, respectively, and that it is saturated in the opposite direction for the remaining 4 or 8 microseconds of each digit interval.

*Reading circuit*

The reading circuit comprises a magnetic reading head adjacent the moving medium, a gate which is opened for a predetermined interval by a circuit which responds to the leading edge of each area of the medium representing a recorded digit, and a circuit which interrogates the gate in response to the trailing edge of each such area. The gate is kept armed, in response to each digit, for an interval long enough to receive and pass the trailing edge signal from a recorded digit 1, but not long enough to pass the corresponding signal from a recorded digit 0.

Referring to Fig. 2, the reading head 28a is located adjacent the medium 27 and may be either the head employed for writing or a separate head.

As each area of positive saturation, i.e., each recorded digit, on the medium passes adjacent the reading head, it induces on a reading coil 25a a signal which is the first derivative of the signal employed for writing the digit. Since each digit 0 or 1 is written with a square positive pulse, the output signal from coil 25a in response to each digit comprises a leading positive pulse and a trailing negative pulse, as shown in Fig. 2. The spacing between the leading pulse and the trailing pulse depends upon whether the corresponding digit is 0 or 1. If it is 0, the spacing between these pulses is, in the present example, 8 microseconds, whereas if it is a 1, the spacing between pulses is 4 microseconds.

The output from coil 25a is connected by a pair of leads 30 and 31 to a class B or class C amplifier 32 which amplifies only the positive leading pulse of each digit pair and therefore produces a negative output pulse in response to the leading edge of each digit. Each output pulse from amplifier 32 is fed by a pair of leads 33 and 34 to an output terminal 35 and may be employed there to drive a timing pulse generator for synchronizing the reading and writing circuits and/or other computer elements. For example, the output pulse from terminal 35 may be fed through a suitable pulse polarity inverter (not shown) to the input terminal 15 (Fig. 1) of the writing circuit thereby providing a self-clocking system. Each output pulse from amplifier 32 is also applied by lead 33 to a pulse generator $PG_2$, which is similar to pulse generators $PG_0$ and $PG_1$ described in relation to Fig. 1. In response to each pulse on lead 33, pulse generator $PG_2$ produces a square pulse which arms a gate $G_2$ through a control lead 36. Gate $G_2$ is similar to gates $G_0$ and $G_1$ described in relation to Fig. 1, and is armed only for the duration of each pulse from $PG_2$. In the present example, the square pulses from $PG_2$ are 6 microseconds wide for reasons described below.

Each positive and negative pulse pair from coil 25*a* is fed through lead 30 to a second channel comprising a class A amplifier 37 and a lead 38 for interrogating gate $G_2$. Amplifier 37 inverts every pulse, so that each digit is represented on lead 38 by a leading negative pulse and a trailing positive pulse. The leading negative pulse in each digit pair has no effect on gate $G_2$, but the trailing positive pulse is passed by gate $G_2$ if that gate is armed. Since gate $G_2$ is armed in coincidence with the leading pulse of each digit pair and remains armed for 6 microseconds, and since the trailing pulses for the digits 0 and 1 follow the leading pulses by 8 and 4 microseconds, respectively, it will be seen that the trailing pulse for each digit 1 is passed by gate $G_2$, whereas the corresponding pulse for each digit 0 arrives at gate $G_2$ after the latter is closed. Therefore, the output signal from gate $G_2$, which is fed by a lead 40 to an output terminal 41, comprises a negative pulse corresponding to each digit 1, while there is no pulse output from gate $G_2$ corresponding to any digit 0.

It will be apparent from the foregoing description of the illustrative writing and reading circuits that the invention is not limited to the binary system. A separate pulse width may be assigned to each of any number of different items of information, so that the writing circuit (Fig. 1) may, for example, have *n* channels representing the various digits of the radix *n*, or there may be additional channels, each assigned a unique pulse width, for representing control functions or alphabetical indicia rather than digits. In such case the reading circuit (Fig. 2) need not include gate $G_2$ and its controls, the different items of information being identified by the time spacing between the pulse pairs at the output of amplifier 37. Alternatively, amplifier 37 may be followed by a class B or C amplifier so that only the trailing edge signals appear at the output terminal 41, and these signals may be identified by a time comparison with signals from terminal 35.

I claim:

1. In a computer having a moving magnetizable medium, the combination of means for normally magnetizing the medium to saturation in a first direction of magnetic polarity; information input means for producing signals representative of unique items of information; and transducing means coupled to the input means and operable in response to the occurrence of a signal, representative of a given item of information, for magnetizing the medium to saturation in a second direction of magnetic polarity during a time interval having a duration uniquely corresponding to the given item of information.

2. In a computer having a magnetizable medium, the combination of: means for normally magnetizing the medium to saturation in a first direction of magnetic polarity; *n* information channels, each channel being adapted to receive a signal representing a unique item of information, information input means for transmitting signals to said channels, and a recording circuit operable in response to receipt of a signal by a given channel for magnetizing an area of the medium to saturation in a second direction of magnetic polarity, the size of said area being uniquely corresponding to said given channel.

3. In a computer, the combination of: a moving magnetizable medium; an energizable transducer disposed in cooperative relation with the medium; means for normally energizing the transducer in a first direction of polarity; information input means for producing signals representative of unique items of information; and an energizing circuit coupling the input means to the transducer and operable in response to a signal representing a given item of information to energize the transducer in a direction of polarity opposite to said first direction of polarity for a time interval having a duration uniquely corresponding to said given item of information.

4. In a computer wherein digital information is represented by a series of pulses, the combination of: a 0 channel and a 1 channel, means for pulsing the 0 channel to represent the digit 0, means for pulsing the 1 channel for representing the digit 1, a transducer, a circuit interconnecting the 0 and 1 channels and the transducer for normally energizing the transducer in a first direction of polarity and for energizing the transducer in a direction of polarity opposite to said first direction of polarity for a first duration in response to each pulse in the 0 channel and for a second duration in response to each pulse in the 1 channel, and a recording medium disposed in cooperative relationship with the transducer and upon which the transducer records a signal in response to each energization of the transducer.

5. In a computer wherein digital information is represented by a series of pulses; the combination of, a 0 channel and a 1 channel, means for pulsing the 0 channel to represent the digit 0, means for pulsing the 1 channel to represent the digit 1, a respective pulse generator in each of said channels operable in response to a pulse in the related channel for generating a square pulse of a unique width corresponding to the respective channel, a magnetic writing transducer, a magnetizable medium moving adjacent to said transducer, and a circuit interconnecting the pulse generators and the transducer to energize the latter for magnetizing the medium to saturation in a first direction of magnetic polarity during the absence of a pulse from either pulse generator and to saturation in a direction of magnetic polarity opposite to said first direction of magnetic polarity for the duration of each pulse from a pulse generator.

6. In a computer, the combination of: a moving magnetizable medium; a transducer disposed in cooperative relation with the medium; means for normally energizing the transducer in a first direction of polarity; information input means for receiving signals representative of items of information; an energizing circuit controlled by said input means for developing a recording signal of unique duration corresponding to the item of information received by said input means; and means for applying said recording signal to said transducer in a manner to energize said transducer in a direction of polarity opposite to said first direction of polarity for the duration of said recording signal.

7. In a magnetic recording system for storing binary information in a series of equal-sized contiguous cells along a recording track of a moving magnetic medium, the combination of: a transducer disposed in cooperative relation with the medium; means for normally energizing the transducer in a first polarity; information input means for receiving a signal representative of an item of information; an energizing circuit controlled by said input means and operable to reverse the direction of energization of said transducer for magnetizing a first portion of said cell in a polarity opposite to said first polarity, said first portion of said cell having a length uniquely corresponding to said item of information.

8. In a computer including a moving medium having successive areas thereon in a predetermined state of magnetization to represent respective numeral values whereby the leading edges of said areas in the direction of movement of the medium are regularly spaced, and the trailing edge of a given area is spaced from the leading edge of the given area by either a first distance to represent a first numeral value or by a second distance to represent a second numeral value, the combination of: a reading transducer disposed adjacent the path of the medium and operable to produce a first readout signal in response to the movement adjacent the transducer of the leading edge of each area and a second readout signal in response to the movement adjacent the transducer of the trailing edge of each area; gating means connected to receive the signals from said transducer; and gate control means responsive to said first readout signal for controlling said gating means to produce an output signal from said gating means only in response to the second readout signals derived from areas representing said first numeral values.

9. In a computer including a moving magnetizable medium having successive areas thereof in predetermined states of magnetization to represent items of information, the length of each area along the direction of movement of the medium being uniquely related to an item of information represented by said area, the combination of: a reading transducer disposed adjacent the path of the medium and energized to produce a pulse of first polarity in response to the movement adjacent the transducer of the leading edge of each of said areas and a pulse of opposite polarity in response to the movement adjacent the transducer of the trailing edge of each of said areas; a gate connected to receive the output of said transducer; and gate control means connected to the output of said transducer and having an arming connection to said gate, said gate control means operative on receipt of said pulse of first polarity to arm said gate for a predetermined period whereby an output signal is developed when said pulse of opposite polarity is received by said gate within said predetermined period.

10. In a computer including a moving medium having successive areas thereon in a predetermined state of magnetization to represent respective numeral values whereby the leading edges of said areas in the direction of movement of the medium are regularly spaced, and the trailing edge of a given area is spaced from the leading edge of the given area by either a first distance to represent a first numeral value or by a second distance to represent a second numeral value, the combination of: a reading transducer disposed adjacent the path of the medium and operable to produce a readout signal in response to the movement adjacent the transducer of each leading and each trailing edge of each area; a normally closed gate having an interrogating input coupled to the transducer; means coupled to the transducer for arming the gate in response to the first readout signal from the transducer in each pair of signals related to a given area of the medium; and means for maintaining the gate armed for a predetermined time interval.

11. In a computer including a moving magnetizable medium having successive areas thereof in a predetermined state of magnetization to represent items of information, the length of each area along the direction of movement of the medium being uniquely related to an item of information represented by said area, the combination of: a reading transducer disposed adjacent the path of the medium and operable to produce a first readout signal in response to the movement adjacent the transducer of the leading edge of each area and a second readout signal in response to the movement adjacent the transducer of the trailing edge of each area; gating means connected to receive the output of said transducer; and gate control means responsive to first readout signals for controlling said gating means to produce an output signal from said gating means only in response to second readout signals derived from areas having a length less than a predetermined length.

12. In a magnetic storage system, the combination of: a moving magnetizable medium; a writing circuit for recording bits of information in a series of equal-sized contiguous cells along a recording track of said medium, said writing circuit comprising, a transducer disposed in cooperative relation with said medium, means for normally energizing said transducer in a first polarity, information input means for receiving a signal representative of an item of information, a timing input for receiving timing pulses, an energizing circuit jointly controlled by said information input means and said timing pulses and operable to reverse the direction of energization of said transducer for magnetizing a first portion of said cell in a polarity opposite to said first polarity, the length of said first portion uniquely corresponding to said item of information; a reading circuit including reading means for detecting said magnetized cell and operable to produce a first readout signal in response to the detection of the leading edge of said first portion of said cell and a second readout signal in response to the detection of the trailing edge of said first portion of said cell, a first output circuit coupled to said reading means and conditioned by said first readout signal to produce a manifestation representative of said item of information upon receipt of said second readout signal, a second output circuit coupled to said reading means and operable to produce a timing pulse in response to the receipt of said first readout signal, and a connection for applying said timing pulse to said timing input of said writing circuit.

13. An information recording system comprising: timing signal input means; information signal input means; a plurality of normally closed gates each corresponding to a different item of information and each connected to said timing signal input means; gate arming means connected to said information signal input means for arming the gate corresponding to the item of information to be recorded; a respective pulse generator connected to the output of each of said gates and operable upon receipt of a timing signal from said gate for generating a pulse whose duration is uniquely related to said item of information; a moving storage medium; means connected to said pulse generators and operable in response to a pulse from said pulse generators for energizing said medium in a predetermined sense for the duration of said pulse.

14. In an information storage system having information stored in a series of equal sized contiguous cells along a recording track of a moving storage medium, the first portion of each cell energized in a given polarity for a distinctive length to represent respective items of information and the remaining portion of each cell energized in opposite polarity, the combination of: a transducer disposed adjacent the path of the medium and operable to produce a first signal in response to the movement adjacent the transducer of the leading edge of said first portion of each cell and a second signal in response to the movement adjacent the transducer of the trailing edge of said first portion of each cell; a normally closed output channel connected to said transducer and operable to give an output in response to the receipt of said second signal when said channel is open; and means connected to said transducer and responsive to said first signal for openig said output channel for a predetermined interval.

15. In an information storage system, the combination of: a storage medium having a series of equal-length contiguous cells, a first portion of each cell being in a first predetermined state and having a distinctive length to represent respective items of information, the remaining portion of each cell being in a second predetermined state; a transducer disposed adjacent the medium, said transducer and said medium being arranged for relative motion and said transducer operable to produce a first readout signal in response to the leading edge of said first portion of each cell and a second readout signal in response to the trailing edge of said first portion of each cell; and an output circuit for receiving said readout signals and operable to produce an output signal only in response to the receipt of said first and second readout signals in a predetermined time relationship.

16. In an information storage system, the combination of: a moving magnetic medium having a series of equal-length contiguous cells, a first portion of each cell being magnetized in a predetermined polarity and having a distinctive length to represent a respective item of information, the remaining portion of each cell being magnetized in the opposite polarity; a transducer disposed adjacent the path of the medium and operable to produce a pulse of first polarity in response to the movement adjacent the transducer of the leading edge of said first portion of each cell and a pulse of opposite polarity in response to the movement adjacent the transducer of the trailing edge of said first portion of each cell; a first output circuit coupled to said transducer and operable to produce an output signal only in response to each pulse of first polarity; and a second output circuit coupled to said transducer and conditioned by each pulse of first polarity to produce an output signal upon receipt of a pulse of opposite polarity within a predetermined interval.

17. An information recording system comprising: a moving energizable medium; timing signal input means; information signal input means; pulse generating means connected to said information signal input means and said timing signal input means for generating pulses, the leading edge of each of which occurs in timed relation to a timing signal and the duration of each of which is uniquely related to an information signal; and recording means connected to said pulse generating means and operable in response to a generated pulse to energize said moving medium in a first predetermined sense for a time interval uniquely related to the duration of said generated pulse and then operable to energize said moving medium in a second predetermined sense for a time interval corresponding to the time difference between the interval between timing signals and the duration of the immediately preceding time interval of energization of the medium in the first predetermined sense.

18. An information recording system comprising: a moving magnetizable medium; timing signal input means; a plurality of information input channels, each channel being adapted to receive a signal representing a different and unique item of information; information input means connected to said timing signal input means for transmitting information signals to said channels in a timed relation to the timing signals; means for normally magnetizing the medium in a first sense; and recording means operable in response to the receipt of an item of information by a given channel to magnetize an area of said moving medium in a second sense, the area so magnetized being uniquely related to said given channel.

19. A magnetic recording and reproducing system comprising: a moving magnetizable medium; a timing signal input; information signal input means; pulse generating means connected to said timing signal input and said information signal input means for generating, in response to each information signal and in a timed relationship to the timing signals, a pulse whose duration is uniquely related to the information signal; recording means connected to said pulse generating means for normally magnetizing said medium in a first sense and operable in response to each of said pulses to magnetize in a second sense a portion of said medium whose area is uniquely related to said generated pulse; reproducing means disposed adjacent said medium and operable in response to changes in the magnetic sense of said medium to generate pulses, the polarity of which indicates the direction in which the magnetic sense of said medium changes; an output circuit having an enabled and disabled state; gating means connected to said reproducing means for normally maintaining said output circuit in one of its states and operable upon the sequential receipt of a pulse having a first predetermined polarity followed at a predetermined interval by a pulse having a second predetermined polarity to change the state of said output circuit; means connected to said second transducing means for generating a timing signal in response to the generation by said second transducing means of a pulse having a given polarity; and a connection for applying said timing signal to said timing signal input.

20. An information storage system comprising: a moving storage medium; a timing signal input; information signal input means; pulse generating means connected to said timing signal input and said information signal input means for generating pulses whose leading edges occur in timed relationship to said timing signals and of duration uniquely related to said information signals; recording means connected to said pulse generating means and operable in response to a generated pulse to energize said medium in a first predetermined sense for a time interval uniquely related to the duration of said generated pulse and then operable to energize said medium in a second sense for a time interval corresponding to the time difference between (1) the time interval between timing signals and (2) the duration of the immediately preceding time interval of energization of the medium in the first predetermined sense; reproducing means disposed adjacent said medium and operable to generate a pulse upon each change in the sense of energization of said medium; an output circuit; gating means connected to said output circuit and said reproducing means and operable to cause said output circuit to produce an output signal only upon the sequential receipt from said reproducing means of a first pulse having a first predetermined polarity and a second pulse having a second predetermined polarity in a predetermined time relationship; timing signal generating means connected to said reproducing means and operable in response to the receipt from said reproducing means of a pulse having a given polarity to generate a timing signal; and a connection for applying said timing signal to said timing signal input.

21. In a storage system, the combination of: a storage medium; a writing circuit for recording bits of information in a series of equal-sized contiguous storage cells along a recording track of said medium, said writing circuit comprising, a transducer disposed in cooperative relation with said medium, means for normally energizing said transducer in a first polarity, information input means for receiving a signal representative of an item of information, a timing input for receiving timing pulses, an energizing circuit jointly controlled by said information input means and said timing pulses and operable to reverse the direction of energization of said transducer for a time interval uniquely corresponding to said item of information; a reading circuit including, first means for detecting a storage cell and for producing a manifestation representative of the item of information contained in said cell, second means for producing a timing pulse upon detection of each storage cell, and a connection for applying said timing pulse to said timing input of said writing circuit.

22. In an information storage system, the combination of: a magnetizable medium; a timing input for receiving timing signals; information signal input means; pulse generating means connected to said timing input and said information signal input means for generating pulses the leading edge of each of which occurs in timed relation to the timing signal and the duration of each of which is uniquely related to an information signal; recording means connected to said pulse generating means and operable in response to a generated pulse to magnetize said moving medium in a first predetermined sense for a time interval uniquely related to the duration of said generated pulse and then operable to magnetize said moving medium in a second predetermined sense for a time interval corresponding to the difference between the interval between timing signals and the duration of the immediately preceding time interval of magnetization of the medium in the first predetermined sense; means for detecting changes in the magnetic sense of said medium; means for developing a timing signal upon the detection of a change from said second to said first magnetic sense; and a connection for applying said timing signal to said timing input.

References Cited in the file of this patent

UNITED STATES PATENTS 1,695,840 Chauveau ---------------- Dec. 18, 1928

1,968,078 Hershey ---------------- July 31, 1934
2,094,733 Byrnes ---------------- Oct. 5, 1937
2,131,322 Higgitt et al. ---------- Sept. 27, 1938
2,540,654 Cohen et al. ---------- Feb. 6, 1951
2,633,402 Fleming ---------------- Mar. 31, 1953
2,658,946 Kaye ---------------- Nov. 10, 1953
2,658,950 Canfora ---------------- Nov. 10, 1953
2,721,989 Gates et al. ---------- Oct. 25, 1955
2,734,186 Williams ---------------- Feb. 7, 1956